(12) United States Patent
Wikan

(10) Patent No.: US 6,385,877 B1
(45) Date of Patent: May 14, 2002

(54) LIVESTOCK TAG LOCKING SYSTEM

(75) Inventor: Egil Wikan, Os i Østerdalen (NO)

(73) Assignee: Os Husdyrmerkefabrikk A/S, Osterdalen (NO)

( * ) Notice: Subject to any disclaimer, the term of this patent is extended or adjusted under 35 U.S.C. 154(b) by 0 days.

(21) Appl. No.: 09/175,670

(22) Filed: Oct. 20, 1998

(30) Foreign Application Priority Data

Oct. 31, 1997 (NO) ................................. 975015

(51) Int. Cl.$^7$ ................................. G09F 3/00
(52) U.S. Cl. ................ 40/301; 40/300; 40/302
(58) Field of Search ................... 40/301, 300, 302

(56) References Cited

U.S. PATENT DOCUMENTS

| | | | | |
|---|---|---|---|---|
| 3,731,414 A | * | 5/1973 | Murphy et al. | 40/301 |
| 3,748,696 A | * | 7/1973 | Martin | 40/302 X |
| 4,597,208 A | | 7/1986 | Chevillot | |
| 4,635,389 A | * | 1/1987 | Oudelette | 40/301 |
| 4,953,313 A | | 9/1990 | Scott | |
| 5,016,369 A | * | 5/1991 | Parry | 40/301 |
| 5,308,351 A | | 5/1994 | Nehls | |
| 5,461,805 A | * | 10/1995 | Johnson | 40/301 |
| 5,588,234 A | * | 12/1996 | De Jong et al. | 40/301 |
| 6,021,592 A | * | 2/2000 | Caisley | 40/301 |

FOREIGN PATENT DOCUMENTS

| | | |
|---|---|---|
| DK | 163094 | 9/1985 |
| EP | 0 056 533 | 5/1985 |
| EP | 0 105 796 | 7/1986 |
| EP | 0 123 506 | 10/1988 |
| EP | 0 177 201 | 12/1990 |
| EP | 0 212 885 | 9/1991 |
| FR | 2 412 258 | 6/1970 |
| FR | 2 533 802 | 9/1982 |
| FR | 2 550 915 | 8/1983 |
| FR | 2 569 944 | 9/1984 |
| FR | 2 577 380 | 2/1985 |
| FR | 2 578 713 | 3/1985 |
| FR | 2 497 631 | 6/1985 |
| FR | 2 635 437 | 8/1988 |
| IR | 2367252 | 5/1993 |
| NZ | 209333 | 8/1984 |
| NZ | 242727 | 5/1992 |
| WO | WO 90/0605 | 6/1990 |
| WO | WO 95/25426 | 9/1995 |

* cited by examiner

Primary Examiner—Brian K. Green
Assistant Examiner—James M. Hewitt
(74) Attorney, Agent, or Firm—Merchant & Gould P.C.

(57) ABSTRACT

A tamper proof livestock ear tag device including a male component and a female component. The male component includes a panel portion with a surface to carry indicia for identifying livestock, and a stem having a tip. The panel portion and the stem are made integrally of a same material, while the tip is made of a first plastic material and the stem is made of a second plastic material such that the tip is harder than the stem. The male component includes a predefined weakest point in which the male component will tear when a pulling force exceeding a predetermined value is exerted between the tip and the panel portion. The weakest point is at an interface between the stem and the tip. The female component includes an eye portion that is equipped with a retaining ring. The eye portion is made of a third plastic material and the retaining ring is made of a fourth plastic material such that the retaining ring is harder than said eye portion. The retaining ring is molded into the eye portion and is at least partially encased by the material of the eye portion. The retaining ring has a ring portion that is radially bendable so that the ring portion is bent towards a radially external material of the eye portion, when the tip of the male component is pressed through the retaining ring. The female component further includes a cup portion made integrally with the eye portion for receiving at an interior portion the tip of the male component.

16 Claims, 4 Drawing Sheets

LIVESTOCK TAG LOCKING SYSTEM

The present invention relates to a livestock tag locking system in accordance with the preamble of claim 1 hereinbelow. The invention also relates to a male component of a livestock tag locking system according to the preamble of claim 2 and a female component of a livestock tag locking system according to the preamble in claim 6.

Livestock tags of this kind have become widespread, especially in those countries which have a so-called industrial livestock production. In these countries such tags have all but completely replaced the previous conventional marking which was carried out by cutting a notch in the animal's ear or cutting away a small piece thereof, thereby permitting identification of the animal's owner. The earlier branding widely used in some countries is also well on the way to being replaced by livestock tags. The livestock tags are produced in a number of different colors and shapes, which facilitates identification even at a distance.

The livestock tags are not only capable of being used to identify the owner of the animal, but are also used increasingly to identify the actual individual animal, so that it is possible to keep a record of the course of the individual animal's life, such as disease, vaccination etc. Recently, there has been an escalation of demands that it should be possible to trace meat from the livestock producer to the meat counter and back to the individual animal. This is particularly important should there be something wrong with the meat, such as an unduly high bacteria content, residual medicines or the discovery, after the animal has been slaughtered and the meat has found its way into the shops, that there is environmental pollution in the area where the animal has grazed.

Livestock tagging has thus become increasingly important vis-à-vis the quality of the meat. If a trace-back system of this kind is to work in a reliable manner such tags must be tamper-proof. With the previously known tags it has been possible to remove a tag from one animal in order then to fit this tag to another animal, which for some reason or another, e.g., disease or recent use of medicines, should not have been sent to slaughter. Having in mind the enormous sums that could be involved in any loss suffered by a producer if he is unable to obtain the expected price for the animal, it is obvious that for some it must be tempting to tamper with the livestock tagging.

In the EU and EEA area new tagging regulations have been introduced which require such livestock tags to be manipulation-proof. This means that once a tag has been fitted it must not be possible to remove it and fit it to another animal. Furthermore, it is a requirement that the force needed to separate the two tag components must be at least 30 kg, and when the connection between the two tag halves gives, they must be deformed or damaged, thereby rendering them unfit for reuse. This should be the case even after the tag has been worn by the animal for five to six years.

Examples of known livestock tags are taught in EP 56533, EP 105796, EP 123506, EP 177201, EP 212885, DK 163094, FR 2412258, FR 2533802, FR 2550915, FR 2569944, FR 2577380, FR 2578713 and FR 2635437.

Moreover, it has been presented as desirable to be able to recycle the material of the livestock tags after the animal has been slaughtered. Most of the livestock tags known to date involve the use of a metal spike to facilitate the piercing of the animal's ear and/or a metal disc in the female component. This metal spike and the disc cause problems when the tag is to be destroyed or recycled. Before the plastic can be ground up the metal must be removed, making destruction or recycling highly unprofitable. It is therefore a further object of the invention to produce a livestock tag which does not have any metal parts, but where the whole tag consists of plastic, which preferably is also a plastic that can be used as animal feed, alone or mixed with another feed.

The aforementioned objects are achieved by means of a livestock tag locking system in accordance with the characterizing clause of claim 1 hereinbelow, the male component of a livestock tag locking system according to the characterising clause of claim 2 and the female component of a livestock tag locking system according to the characterizing clause of claim 6.

The dependent claims disclose advantageous embodiments of the invention.

The present invention will be described in more detail with the aid of an exemplary embodiment of the invention with reference to the accompanying drawings, wherein:

FIG. 1a a shows a male component of a livestock tag seen from the outside;

Figure 2C:
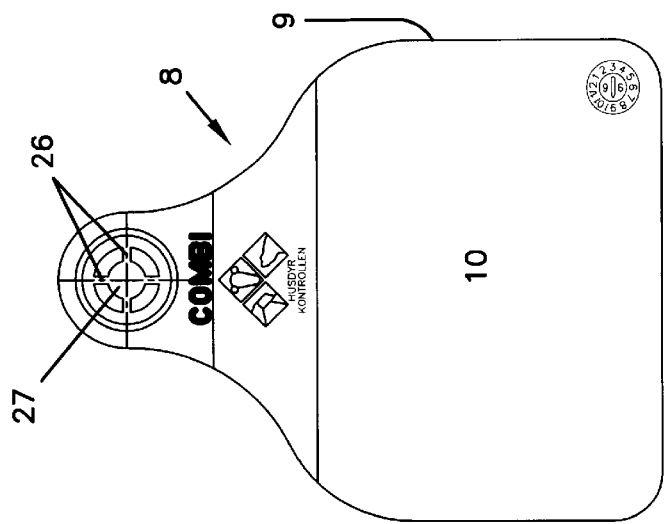
FIGS. 2a shows a female component of a livestock tag seen from the inside.
FIG. 2b shows the female component according to FIG. 2a in section from the side.
Figure 2B:
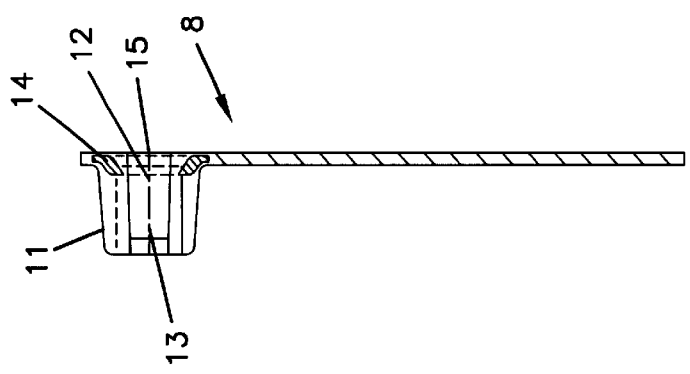
Figure 2A:
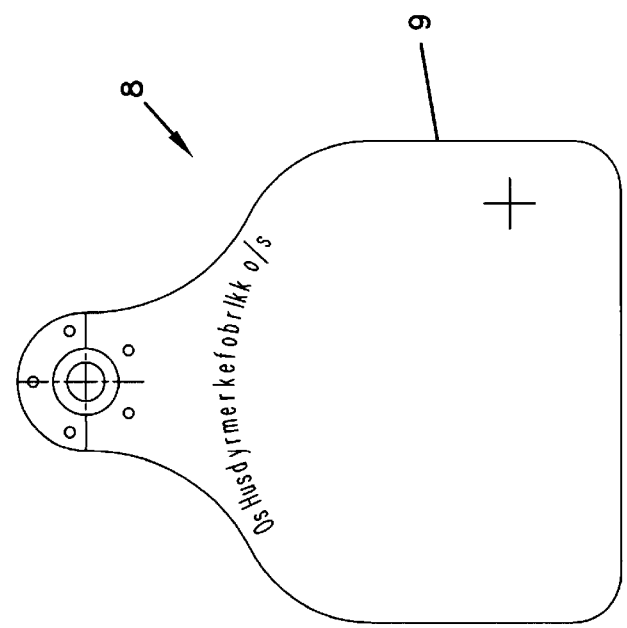
Figure 3:
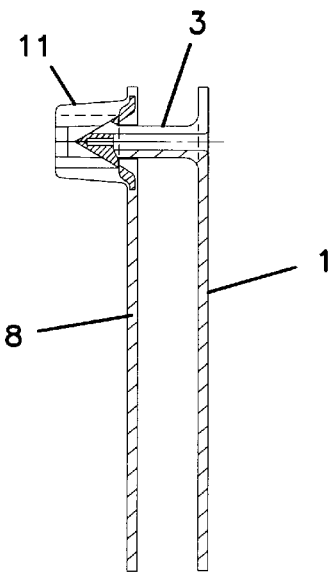
Figure 4:
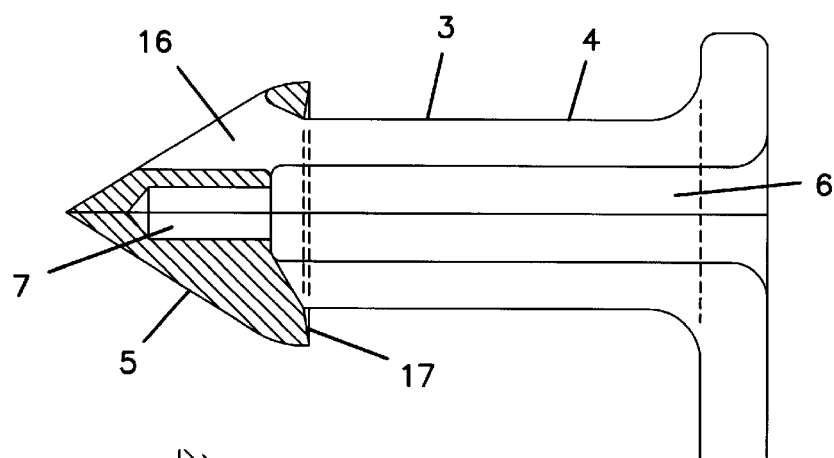
Figure 5:
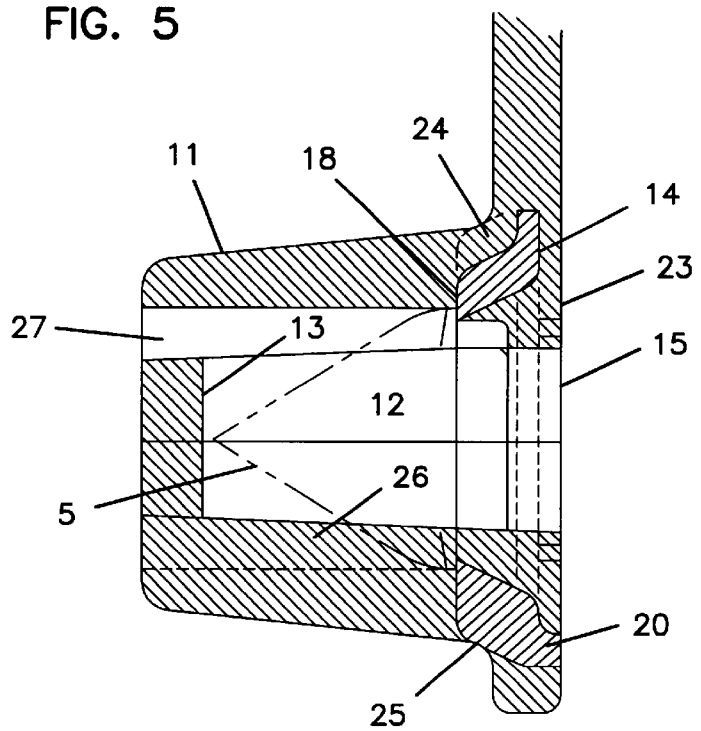
Figure 6:
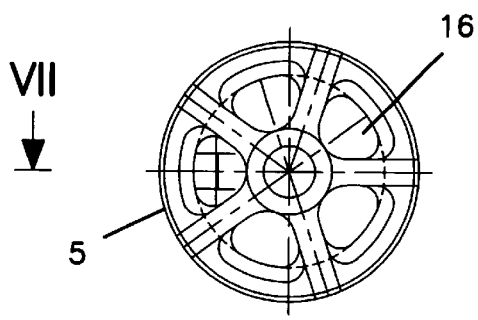
Figure 8:
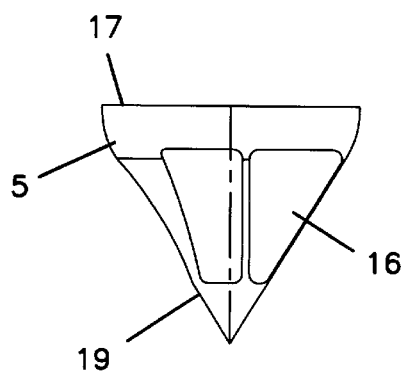
Figure 7:
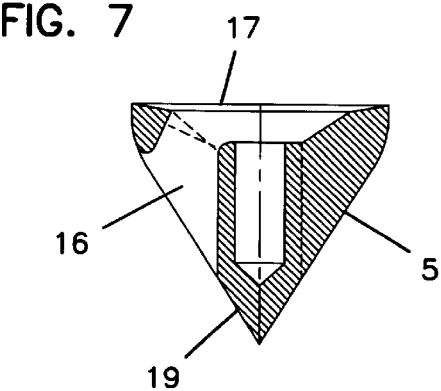
Figure 11:
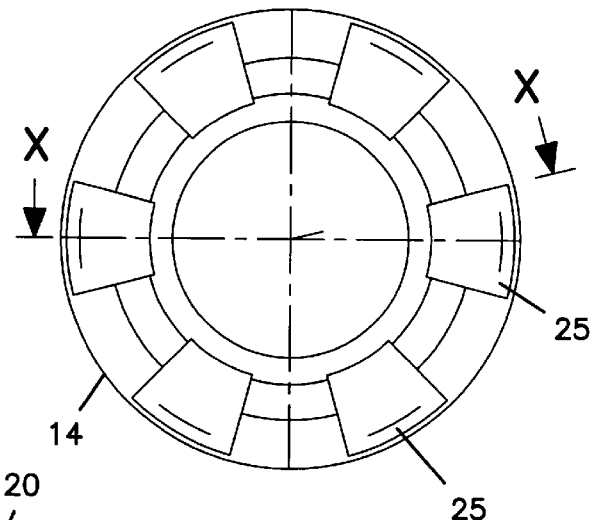
Figure 9:
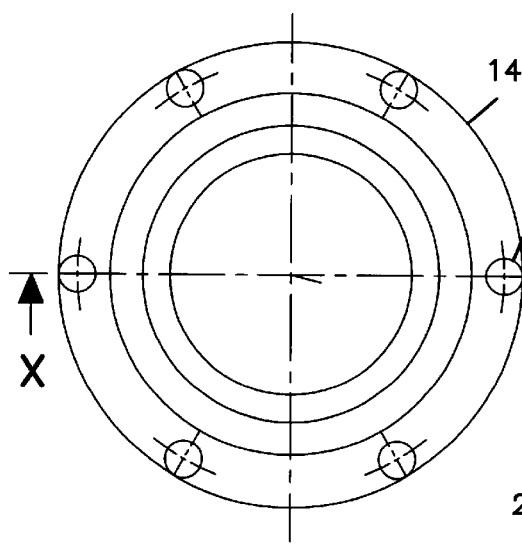
Figure 10:
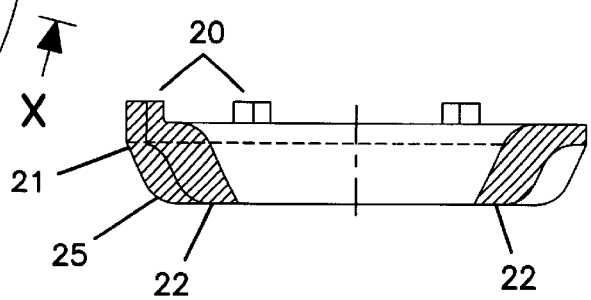

2c shows the female component according to FIG. 2a seen from the outside;

FIG. 3 shows a section through an assembled livestock tag;

FIG. 4 shows a detail of the piercing member of the male component;

FIG. 5 shows a detail of the receiving member of the female component;

FIG. 6 shows the tip of the male component from in front;

FIG. 7 shows a section through the tip along the line VII—VII;

FIG. 8 shows the tip seen from the side;

FIG. 9 shows the ring of the female component in plan view;

FIG. 10 shows the ring of the female component in a section along the line X—X; and FIG. 11 shows the ring of the female component in plan view, seen in the opposite direction of that shown in FIG. 9.

As used in this description, the terms "the outside" and "the inside" refer to the tag when it has been fitted to an animal, where "the inside" faces in towards the animal's ear and "the outside" faces away from the animal's ear. The term "from in front" refers to a direction looking towards the narrowest end of the tip. The "side" of the livestock tag, the male component or the female component is that side which is at right angles to the outside and the inside and is substantially parallel to an axis extending along the longest dimension of the tag.

Figure 1C:
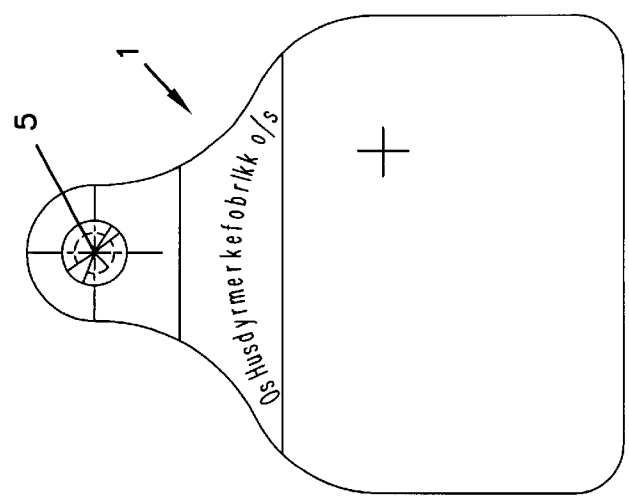
FIG. 1c shows the tag according to FIG. 1a seen from the inside.
Figure 1B:
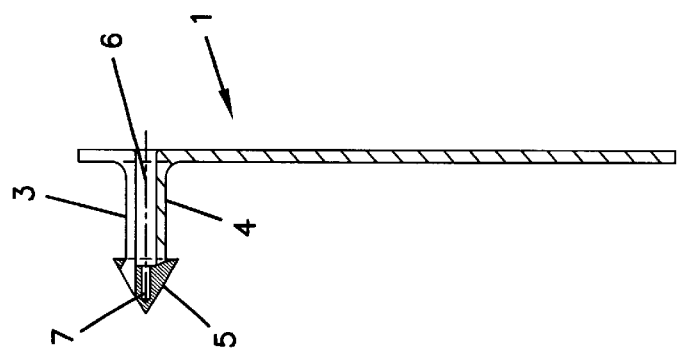
FIG. 1b shows the tag according to FIG. 1a in section from the side.
Figure 1A:
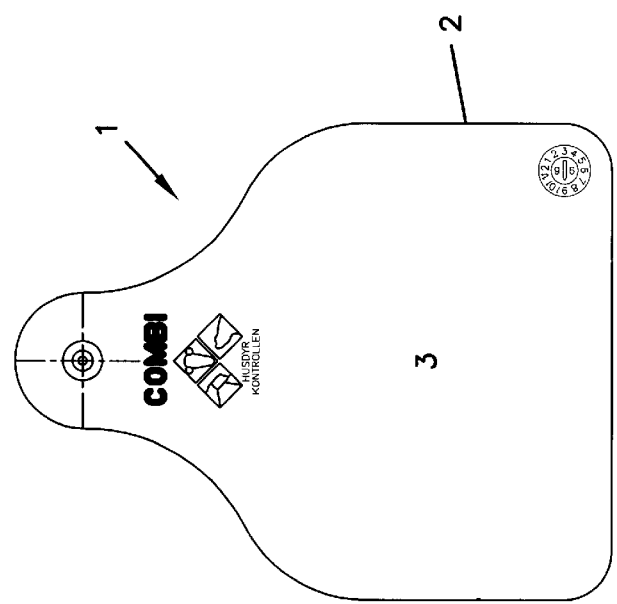

FIG. 1 shows a male component 1 of a livestock tag according to the invention, wherein FIG. 1a shows the male component seen from the outside, FIG. 1b shows a section through the male component, and FIG. 1c shows the male component seen from the inside. The male component 1 consists essentially of a panel portion 2 and a piercing portion 3, which is designed to be passed through the cartilage of the animal's ear. On the outside of the panel portion 2 there is provided a surface 3 for the application of information, such as the identification number of the individual animal, the owner and so forth. The piercing portion 3 comprises a stem 4 and a tip 5. The stem 4 has an eccentric bore 6 which continues in a bore 7 in the tip. The bore 7 is closed at one end in the tip 5. The bores 6 and 7 are designed to receive a tip portion of a applicator, e.g., pliers especially made for the purpose of fitting livestock tags.

FIG. 2 shows a female component 8 for interaction with the male component 1 of FIG. 1, wherein FIG. 2a shows the female component 8 seen from the inside, FIG. 2b shows the female component 8 seen in section, and FIG. 2c shows the female component 8 seen from the outside. The female component 8 also comprises a panel portion 9 on which a surface 10 may also be defined for the application of information. This information may be a duplicate of the information on the face 3 of the male component 1 or may be other information about the animal, its owner etc. Furthermore, the female component comprises a receiving member or cup portion 11 equipped with a bore 12 for receiving the piercing portion 3. The bore 12 is closed at one end towards the bottom 13 of the cup. A ring 14 is embedded in the female component 8 at the opening 15 of the cup portion 11.

The male component 1 and the female component 8 are designed to be placed on their respective sides of the animal's ear.

FIG. 3 shows the livestock tag once assembled, wherein the male component 1 has been inserted by means of its piercing portion 3 into the cup portion 11 of the female component 8. The connection of the two components will be explained in more detail below.

FIG. 4 shows the piercing portion 3 in more detail. As mentioned above, the piercing portion 3 comprises a stem 4 equipped with a bore 6 and a tip 5. The tip 5 is also equipped with a bore 7, which is concentric with the bore 6. The tip 5 is made of a first plastic material which is relatively hard, whilst the stem 4 and the rest of the male component 1 are made of a relatively flexible second plastic material. Through the tip 5 there is formed a plurality of channels 16, into which the plastic material of the stem 4 can penetrate during the moulding of the tag. This will be explained in more detail with reference to FIGS. 7–9. The largest cross-section of the tip 5 is greater than the cross-section of the stem 4, so that a shoulder 17 is formed at the rear end of the tip.

FIG. 5 shows the receiving member or cup portion 11 of the female component 8 in more detail. The cup portion 11 is also equipped with a bore 12 extending from the opening 15 of the cup portion 11 to the cup bottom 13 and has an eye portion mate of a third plastic material. A retaining ring 14 is provided at the opening 15 of the cup portion. The function of the retaining ring 14 is to retain the tip 5 when this has been inserted into the cup portion 11, as indicated in broken lines. The shoulder 17 of the tip 5 rests against a front face 18 on the ring 14. The internal diameter of the ring 14 is smaller than the largest external diameter of the tip 5, but since the ring 14 consists of a fourth plastic material which despite exhibiting a certain rigidity also exhibits a certain elasticity, the ring 14 will be bent somewhat when the tip 5 is inserted therethrough.

The cup portion 11 is also equipped with a plurality of ribs (see FIGS. 2c and 5) evenly distributed around the internal circumference of the cup portion 11. The cup bottom 13 is secured to the ribs 26, thereby forming openings 27 (see FIGS. 2c and 5) in the cup bottom 13 between the ribs 26.

FIGS. 6, 7 and 8 show the tip in more detail. As can be seen from FIG. 5, the tip in this case is equipped with five channels 16 extending from the shoulder or back edge 17 of the tip 5 to its conical front surface 19. The channels 16 have their smallest cross-section close to the rear edge 17 of the tip 5 and become wider towards the conical surface 19. When the male component 1 is to be produced, the tip 5 is moulded first in a suitable plastic material, and the remaining part of the male component 1, the panel 2 and the stem 4 are moulded together with the tip 5. The material which is to constitute the stem 4 then flows through the channels 16. The material of the tip 5 and the material of the stem 4 are preferably so adapted to one another that good bonding is obtained between them at the contiguous faces in the channels 16. Thus, the bonding will take place primarily on the walls of the channels 16. The total area of these walls is very large in comparison with the diameter of the tip 5. The bonding between the material of the tip and the material of the stem 4 will therefore be good. In addition a physical locking between the tip 5 and the stem 4 will also take place as the outer cross section of the channels is greater than the inner cross-section thereof.

Despite the large bonding area, however, the total cross-sectional area of the channels 16 at the rear edge 17, and thus also the cross-section of the stem 4 in the same area will be smaller than the cross-section of the stem 4 otherwise. The weakest point of the piercing portion 3 will therefore be in the junction between the stem 4 and the channels 16. If sufficient tension is exerted on the male component 1 after the piercing portion 3 has been inserted into the cup portion 11, the piercing portion 3 will therefore give at the junction area between the stem 4 and the tip 5. When adjusting the cross-section in this area it is therefore possible to set by design a specific breaking strength, which according to the regulations must be at least 30 kg. Breaks will not occur at any other point unless a cutting tool is used.

FIGS. 9, 10 and 11 show a ring 14 for embedment in the cup portion 11. The ring 14 comprises a plurality of projections 20 distributed evenly around the circumference of the inward facing (towards the animal's ear) face of the ring, a cylindrical ring portion 21 extending radially inwards from the projections 20 and a conical ring portion 22 extending obliquely inwards in the axial direction of the ring 14. The projections 20 are designed to hold the ring portion spaced apart from the surface 23 of the cup portion 11 (see FIG. 5) when the retaining ring 14 is to be moulded together with the cup portion 11. The retaining ring 14 thus lies completely encased by the cup portion 11, with the exception of one surface of the projections 20. The ring portion 22, will, when the tip is pressed therethrough, because the tip 5 has a largest external diameter greater than the internal diameter of the ring 14, be pressed outwards relative to the ring portion 21. The cup portion 11 will, with the plastic material 24 that is outside the ring portion 22, seek to counter this bending motion. When the tip 5 has been passed right through the retaining ring 14, the material 24 will help to press the ring portion 22 back to its starting position.

The retaining ring 14 is also equipped with a plurality of projections 25 distributed evenly along the outer circumference of the ring portion 22 (see FIGS. 10 and 11). The projections 25 help, in the same way as the projections 20, to position the ring in the cup portion 11. The plastic material which constitutes the cup portion can flow between the projections 20, and the ring 14 will therefore be almost completely encased by the plastic material of the cup portion.

The tip 5 and the retaining ring 14 are preferably made of the same rigid, hard material. The other parts of the male component 1 and the female component 8 are made of another considerably more flexible plastic material.

Should an attempt be made to separate the male component 1 from the female component 8 after they have been brought together, this would not be possible without both the male component 1 and the female component 8 being rendered unfit for reuse. An attempt to pull the components apart, which would call for the use of a tool as the breaking strength is as great as at least 30 kg, would result in the stem 4 breaking at the junction with the channels 16 in the tip 5. The tip 5 would remain in the cup portion 11 and would not be capable of being passed through the retaining ring 14, as the ring portion 22 would function as a barb. It is true that a hole could be made in the bottom 13 of the cup portion 11, but it would not be possible to close this hole so as to conceal the fact that the tag has been tampered with. An attempt to press the tip 5 out of the cup portion 11 and through the retaining ring 14 by exerting pressure on the bottom 13 of the cup portion 11 from the outside would result firstly in damage to the bottom 13 of the cup portion 11, whose connection with the cup portion 11 has otherwise been weakened on account of the openings 27, and also in damage to the tip 5, as the plastic material, although relatively hard, will not be capable of withstanding such strain. Another way of trying to separate the two components is to clip or cut through the ring 14, so that the tip 5 can be pulled therethrough or passed sideways out through the incision in the cup portion 11. However, the female component must then be abandoned and the tip 5 and/or the stem 4 would also probably be damaged. Damage to these could result in it being impossible to put the male component in the tag pliers and it being difficult to pierce the animal's ear with the piercing portion 3. Moreover, there would be no female component to receive the piercing portion.

There are therefore no known ways in which to separate the two components without it being clearly visible that the tag components have been tampered with. At the same time recycling of the tag material is fully possible, since the entire tag consists of plastic which can be readily recycled or destroyed in a convenient manner.

What is claimed is:

1. A tamper proof livestock ear tag device, comprising:
   a male component and a female component, said male component comprising a panel portion with a surface to carry indicia, to identify livestock, and a stem having a tip, said panel portion and said stem being made integrally of a same material, said tip being made of a first plastic material and said stem being made of a second plastic material, said tip being harder than said stem;
   wherein the male component comprises a predefined weakest point, in which the male component will tear when a pulling force exceeding a predetermined value is exerted between said tip and said panel portion, said weakest point being at an interface between said stem and said tip, said tip having recesses formed therein, and said second material filling said recesses and forming said weakest point, said weakest point being formed integral with said stem, said weakest point having a total cross section smaller than said stem, whereby said second material filling said recesses considerably increases a contact surface between said second material and said tip; and
   wherein said female component comprises an eye portion, said eye portion being equipped with a retaining ring, said eye portion being made of a third plastic material and said retaining ring being made of a fourth plastic material, said retaining ring being harder than said eye portion, said retaining ring being molded into said eye portion and being at least partially encased by the material of said eye portion, said retaining ring having a ring portion, said ring portion being radially bendable, so that said ring portion is bent towards a radially external material of said eye portion when said tip of the male component is pressed through said retaining ring, said female component further comprising a cup portion made integrally with said eye portion, said cup portion receiving at an interior portion said tip of the male component.

2. A device according to claim 1, wherein said recesses are channels, extending from a rear edge of said tip to a conical surface of said tip.

3. A device according to claim 2, wherein said channels diverge in an outward direction from a center of said tip from said rear edge towards said conical surface.

4. A device according to claim 2, wherein said channels are evenly distributed along a periphery of said tip.

5. A device according to claim 2, wherein the number of channels are between three and six.

6. A device according to claim 1, wherein said retaining ring having projections, said projections being designed to position said retaining ring during said molding in said eye portion.

7. A device according to claim 6, wherein said projections having at least one surface which is flush with a surface on said eye portion.

8. A device according to claim 1, wherein said cup portion internally is equipped with axial ribs, said cup portion having a bottom, said bottom being connected to said ribs, openings being defined in said cup bottom between said ribs.

9. A device according to claim 1, wherein said first and fourth plastic materials are the same material.

10. The device according to claim 1, wherein said second and third plastic materials are the same material.

11. A male component of a tamper proof livestock ear tag device to be inserted in a corresponding female component, the male component comprising:
   a panel portion with a surface to carry indicia, to identify livestock, and a stem having a tip, said panel portion and said stem being made integrally of a same material, said tip being made of a first plastic material and said stem being made of a second plastic material, said tip being harder than said stem;
   wherein the male component comprises a predefined weakest point, in which the male component will tear when a pulling force exceeding a predetermined value is exerted between said tip and said panel portion, said weakest point being at an interface between said stem and said tip, said tip having recesses formed therein, and said second material filling said recesses and forming said weakest point, said weakest point being formed integral with said stem, said weakest point having a total cross section smaller than said stem, whereby said second material filling said recesses considerably increases a contact surface between said second material and said tip.

12. A device according to claim 11, wherein said recesses are channels, extending from a rear edge of said tip to a conical surface of said tip.

13. A device according to claim 12, wherein said channels diverge in an outward direction from a center of said tip from said rear edge towards said conical surface.

14. A device according to claim 12, wherein said channels are evenly distributed along the periphery of said tip.

15. A device according to claim 12, wherein the number of channels are between three and six.

16. A female component of a tamper proof livestock ear tag device for receiving a corresponding male component to be inserted therein, the female component comprising:

an eye portion, said eye portion being equipped with a retaining ring, said eye portion being made of a first plastic material and said retaining ring being made of a second plastic material, said retaining ring being harder than said eye portion, said retaining ring being molded into said eye portion and being at least partially encased by the material of said eye portion, said retaining ring having a ring portion, said ring portion being radially bendable, so that said ring portion is bent towards a radially external material of said eye portion when a tip of said corresponding male component is pressed through said retaining ring, said female component further comprising a cup portion made integrally with said eye portion, said cup portion being formed for receiving at an interior portion said tip of said corresponding male component to be inserted therein and said cup portion being formed so as to define a closed circumferential surface;

wherein said cup portion is internally equipped with axial ribs, said cup portion having a bottom, said bottom being connected to said ribs; and wherein openings are provided in said cup bottom between said ribs.

* * * * *